United States Patent [19]

Sung et al.

[11] Patent Number: 5,654,603
[45] Date of Patent: Aug. 5, 1997

[54] MAGNETIC TOP STICK APPARATUS AND METHOD FOR MAKING SAME

[75] Inventors: An-Min J. Sung, Euclid; Perry A. DelVecchio, Mentor; Hong Tsai, Wickliffe; James F. Ward, Rocky River; Robert S. Barnard, Highland Heights, all of Ohio

[73] Assignee: Reliance Electric Industrial, Cleveland, Ohio

[21] Appl. No.: 537,047

[22] Filed: Sep. 29, 1995

[51] Int. Cl.$^6$ .................. H02K 3/493; H02K 15/00
[52] U.S. Cl. .................................... 310/214; 310/42
[58] Field of Search ................ 310/42, 214; 29/596

[56] References Cited

U.S. PATENT DOCUMENTS

| | | | |
|---|---|---|---|
| 872,324 | 12/1907 | Bergman | 310/214 |
| 917,138 | 4/1909 | Robinson | 310/214 |
| 1,231,588 | 7/1917 | Frederick et al. | 310/214 |
| 1,605,112 | 11/1926 | Huggins | 310/214 |
| 2,134,795 | 11/1938 | Myers | 310/214 |
| 2,201,699 | 5/1940 | Myers | 310/214 |
| 3,031,593 | 4/1962 | Cametti | 310/214 |
| 3,093,764 | 6/1963 | King et al. | 310/214 |
| 3,437,858 | 4/1969 | White | 310/214 |
| 3,852,137 | 12/1974 | Balke et al. | 264/258 |
| 3,904,724 | 9/1975 | Kipple et al. | 264/71 |
| 3,976,902 | 8/1976 | Simmonds | 310/214 |
| 4,425,521 | 1/1984 | Rosenberry, Jr. et al. | 310/214 |
| 4,427,910 | 1/1984 | Richter et al. | 310/214 |
| 4,761,580 | 8/1988 | Hein et al. | 310/214 |
| 4,761,581 | 8/1988 | Watanabe et al. | 310/214 |
| 4,827,597 | 5/1989 | Hein et al. | 310/214 |
| 4,857,788 | 8/1989 | Hein et al. | 310/314 |
| 4,918,801 | 4/1990 | Schwarz et al. | 29/596 |
| 5,124,607 | 6/1992 | Rieber et al. | 310/214 |
| 5,252,877 | 10/1993 | Sawa et al. | 310/214 |
| 5,315,244 | 5/1994 | Griebeler | 324/207.21 |

FOREIGN PATENT DOCUMENTS

| | | | |
|---|---|---|---|
| 52-6906 | 1/1977 | Japan | 310/214 |
| 169482 | 9/1921 | United Kingdom | 310/214 |

OTHER PUBLICATIONS

Haysite Reinforced Plastics—Data Sheet May 1, 1993.
Isovolta—Data Sheet Mar. 1993.

*Primary Examiner*—Clayton E. LaBalle
*Attorney, Agent, or Firm*—Michael E. Hudzinski; John M. Miller; John J. Horn

[57] ABSTRACT

A magnetic top stick for use at the opening portion of a core slot of an electromagnetic device includes a group of magnetically anisotropic members arranged in a substantially non-magnetic body adapted to fit snugly within the core slot. The magnetic properties of the group of members combine to provide the top stick with an overall high magnetic permeability in the depth direction of the core slot and overall low magnetic permeabilities in the width and longitudinal directions of the core slot. A convenient method of manufacturing the top stick includes first forming magnetically anisotropic sheets by cold rolling and annealing, then laminating and heat processing the sheets with B stage materials to generate a unitary laminated structure. The unitary laminated structure is sectioned into multiple magnetic flux bars which are in turn disposed in the non-magnetic body forming the top stick.

19 Claims, 6 Drawing Sheets

MAGNETIC TOP STICK APPARATUS AND METHOD FOR MAKING SAME

1. Field of the Invention

The present invention relates to rotating electric machines and more particularly to slot wedges, or top sticks, for use in stators of rotating machines such as electric motors. The invention further relates to a method of manufacturing a top stick having a highly desirable magnetic anisotropic property.

2. Description of the Prior Art

In A.C. rotating electric machines having toothed stators, it is well known to use mechanical slot wedges to hold the stator windings in the slots formed between the stator teeth. In induction motors, wedges having magnetic properties are advantageously used to reduce slot induced magnetic pulsations in the air gap flux caused by the alternating reluctance due to the spaced apart stator slots. Magnetic slot wedges are used for reducing eddy current losses, i.e. surface losses, in an electric motor caused by the interaction of the harmonics in the air gap flux with the conducting surface of the rotor. In addition, with magnetic slot wedges, the magnetizing or exciting current can be minimized while simultaneously generating the desired air gap flux since more of the air gap flux is made available for useful power production.

Generally, it is known that in order to smoothly distribute the magnetic flux in the air gap between the rotor and the stator, eg. sinusoidal distribution, the magnetic resistance for the magnetic flux passing from the winding/stator to the air gap side via the wedge, such as in the motor radial direction, should be as small as possible. Completely filling the slots between the stator teeth with a magnetic material to hold the windings in place would accomplish the above, but would lead to an increased stator slot leakage reactance in the motor resulting in a reduction of power factor, of output torque, and a slower dynamic response. The magnetic resistance influencing the stator slot leakage magnetic flux, i.e. in a motor circumferential direction, should be as large as possible.

As a direct design response to the above competing considerations, powdered metal slot wedges have been proposed. Powdered metal slot wedges are made with wire or iron powder embedded in a non-magnetic polymer epoxy and as such provide an intermediate alternative between completely magnetic materials and completely non-magnetic materials. The magnetic characteristics and properties of this type of slot wedge is proportional to the amount of metallic particles impregnated into the polymer epoxy carrier. Accordingly, by regulating the metallic particle content of the top stick, a trade off must be accepted between the benefits of a moderate permeability characteristic in a motor radial direction, and a low permeability characteristic in a motor circumferential direction. Even with materials having the best properties and under ideal conditions, the trade off result is less than adequate. In addition, powdered metal slot wedges are difficult to manufacture and often fail mechanically in high horsepower motors where large forces are generated.

In U.S. Pat. No. 4,427,910, Richter, et al. propose a substantially non-magnetic slot wedge having a set of parallel metallic laminations which reinforce the wedge body as well as provide for a reduction in slot harmonic losses. Their slot wedge includes a non-magnetic body adapted to fit into a semiclosed stator slot. The non-magnetic body is provided with two rows of parallel laminations of magnetic material disposed in slits extending part way through the width and from both sides of the non-magnetic body. The parallel laminations are perpendicular to the top surface of the body so as to not interfere with the rotor within the stator body. Although harmonic losses occurring in the motor can be somewhat improved through a careful selection of the number and size of the laminations, the slot wedge of this design is difficult to manufacture and not easily installed into a stator slot.

In view of the above shortcomings in the prior art, it is an object of the present invention to provide a magnetic slot wedge which operates efficiently and is easy to manufacture.

It is another object of the present invention to provide a magnetic slot wedge that improves the quality of air gap flux in an electric motor by more evenly distributing the magnetic flux in the slot and core tooth portions of the motor.

It is still another object of the present invention to provide a magnetic slot wedge that facilitates a smooth sinusoidal flux distribution in an electric motor between the rotor and the stator.

It is a further object of the present invention to provide a magnetic slot wedge which reduces the slot harmonic losses with a minimum increase in slot leakage reactance.

It is still further an object of the invention to provide a slot wedge having a magnetic anisotropic characteristic wherein a high permeability axis is formed in the motor radial direction and low permeability axes are formed in the motor circumferential and longitudinal directions.

It is yet a further object of the invention to provide a slot wedge having the required mechanical integrity to hold the stator windings in place while exhibiting the above identified preferred magnetic benefits and characteristics.

Further still, it is an object of the present invention to provide a convenient method of manufacturing a magnetic top stick having desirable magnetic anisotropic benefits and characteristics.

These and other objects and advantages of the present invention will become apparent to those skilled in the art upon a reading and understanding of this specification and drawings.

SUMMARY OF THE INVENTION

In one aspect of the present invention, a magnetically anisotropic slot wedge is provided for use in a toothed stator of an AC electric motor. The slot wedge includes a non-magnetic body member defining a longitudinal dimension which extends along the core slot of the motor. The body member further defines a thickness dimension in a direction of the depth of the core slot and a width dimension in a direction of the width of the core slot. At least one magnetic member is disposed in the nonmagnetic body member to define an overall first magnetic permeability of the wedge in the thickness dimension and substantially smaller second magnetic permeabilities in the width and longitudinal dimensions.

In another aspect of the present invention, the magnetic slot wedge includes a set of magnetic members deposed with non-magnetic body. Each magnetic member among the set of magnetic members is magnetically anisotropic having a high permeability axis in the slot thickness dimension and high magnetic resistance in the slot width and longitudinal dimensions. The longitudinal members collectively define an overall first magnetic permeability of the wedge in the motor radial direction and substantially smaller second and third magnetic permeabilities in the motor circumferential and longitudinal directions.

In yet another aspect of the present invention, the magnetically anisotropic members are disposed in the non-magnetic body in a regular array of rows and columns.

In yet a further aspect of the invention, a method for making a slot wedge is provided wherein magnetically anisotropic sheets are first formed by cold rolling and annealing and then laminated and processed with an epoxy such as a B stage material to generate a unitary laminated structure. The laminated structure is sectioned into multiple magnetic flux bars which are in turn disposed in a non-magnetic body forming a slot wedge adapted for use in a toothed stator.

BRIEF DESCRIPTION OF THE DRAWINGS

The invention may take physical form in certain parts and arrangements of parts, a preferred embodiment of which will be described in detail in this specification and illustrated in the accompanying drawings which form a part hereof and wherein.

DETAILED DESCRIPTION OF THE INVENTION

Figure 1:
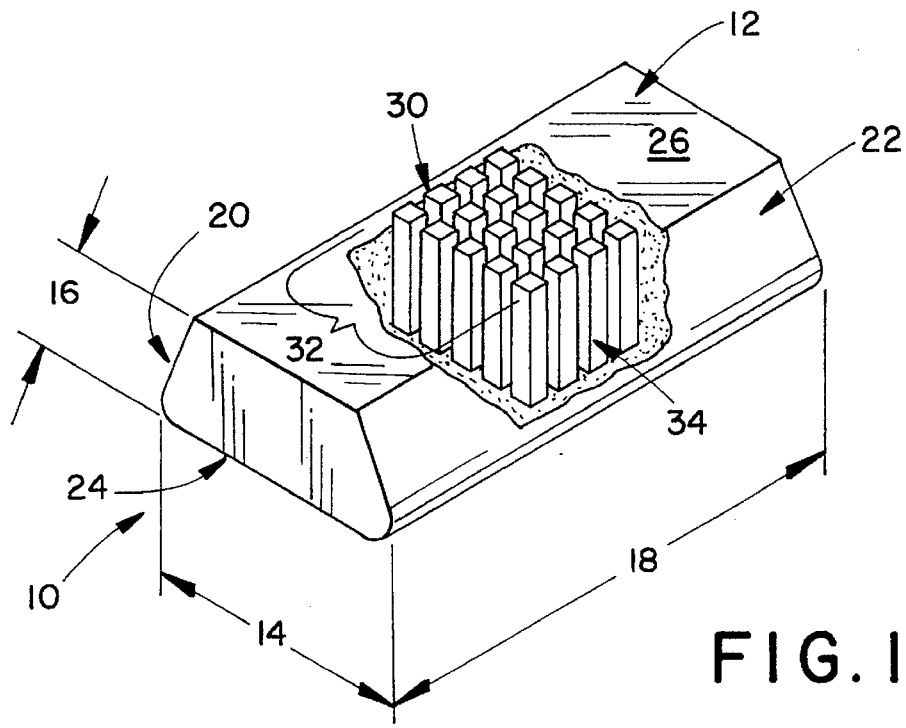
FIG. 1 is a partially broken away perspective view of a short length of the magnetic slot wedge according to the preferred embodiment of the present invention.

With reference now to the drawings wherein showings are for purposes of illustrating the preferred embodiment of the invention only and not for purposes of limiting same, and wherein like numerals will be used to indicate like elements, FIG. 1 shows a magnetic slot wedge 10 according to the present invention. The magnetic slot wedge 10 includes a non-magnetic body 12 which is preferably formed of a polymer but may comprise reinforced plastic, fiberglass, or other non-magnetic materials or compositions exhibiting suitable mechanical strength, thermal, chemical, and other properties required for use in a stator core slot. In the preferred embodiment illustrated in the FIGURE, the body 12 is preferably made from a machinable heat curable B-stage material such as commonly found and used in the industry although other polymeric materials such as epoxies may be used. The width 14 of the non-magnetic body 12 corresponds to the width of the slot into which the wedge 10 is to be inserted. Similarly, the thickness 16 and length 18 respectively correspond to the thickness and longitudinal length of the stator slot into which the wedge 10 is to be inserted. As shown in the FIGURE, the body 12 defines a pair of shoulder surfaces 20, 22 which taper the width 14 of the body 12 from a bottom surface 24 to a more narrow top surface 26. As such, the shoulder surfaces adapt the body 12 for engaging and locking into a stator slot having a matching reverse image tapered construction. In the preferred configuration illustrated, the bottom surface 24 of the wedge 10 is defined as that surface facing the coil windings of an AC electric motor when the wedge is positioned in a slot of a toothed stator. The top surface 26 of the wedge 10 is defined as that surface facing the air gap when the wedge is positioned in the slot of the toothed stator.

A group of magnetic elements 30 are disposed within the non-magnetic body 12 of the slot wedge 10 as illustrated in the FIGURE. In order to promote a magnetic effect which is as evenly distributed over the elongate wedge body as possible, the elements 30 are arranged in a regular series of rows 32 and columns 34. In applications where an unevenly distributed magnetic characteristic is desired, e.g. a sinusoidal or stepped magnetic characteristic in the motor longitudinal direction, the elements 30 may be disposed in the wedge body in alternative arrangements such as in a semi-regular array. In the preferred embodiment illustrated, however, each of the columns 34 comprise five (5) elements while the number of elements forming the rows 32 is based on the longitudinal length of the wedge. In the cut away portion of the slot wedge illustrated in the FIGURE, each row exposed there includes four (4) elements. Additional elements are disposed in the wedge but not exposed in the cut away and are therefore not illustrated in the FIGURE. Each of the elements 30 in the body 12 are substantially rectangular in overall shape and extend through the wedge from the bottom surface 24 of the body to the top surface 26 of the body. Although other geometric configurations are possible as would be understood by those skilled in the art, the rectangular shape is desired primarily for its ease of manufacture. The preferred method of manufacturing the slot wedge 10 will be described in detail below.

Generally in motor design, the magnetic permeability for the magnetic flux passing from the core teeth of the stator to the rotor should be made as high as possible in order to smoothly distribute the flux in the air gap, eg. a sinusoidal flux distribution. However, as indicated above, isotropic slot wedges having a uniform magnetic characteristic tend to pass unacceptable amounts of leakage metal flux from one stator tooth portion to the next stator tooth portion via the wedge width 14 dimension resulting in motor inefficiency and heat loss. The magnetic resistance should be as high as possible in the width dimension. To the extent that leakage flux travels through the slot wedge in the longitudinal or length 18 dimension, the magnetic resistance in that direction should be maximized as well. The present invention accomplishes all of the above design goals. One advantageous result deriving from the characteristics and configuration and arrangement of the elements as illustrated is that an overall high magnetic permeability in the thickness 16 dimension of the wedge is provided while simultaneously minimizing the magnetic permeability in both the width 14 and longitudinal or length 18 dimensions.

Figure 2:
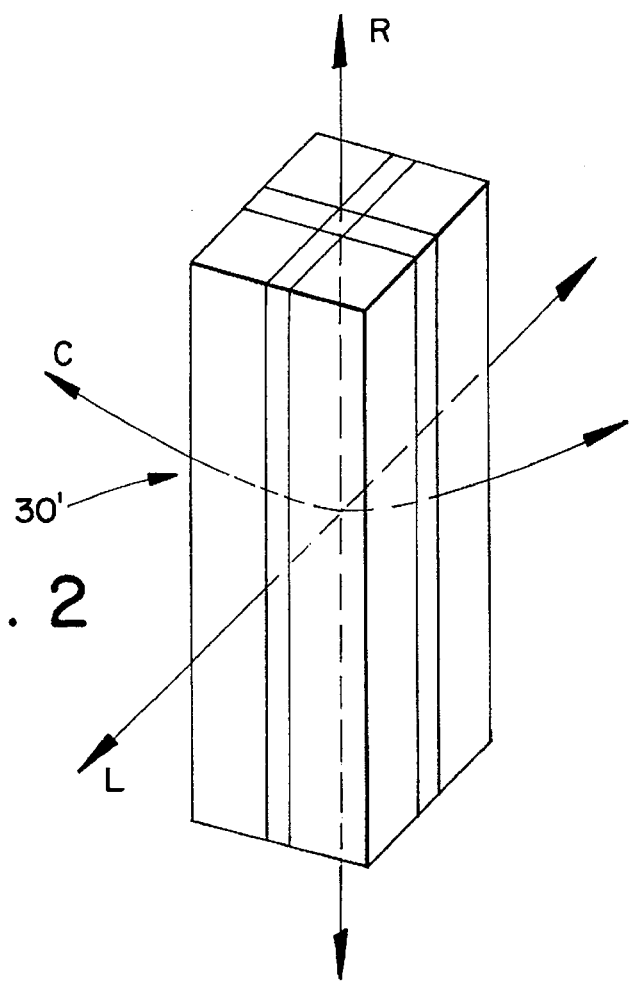
FIG. 2 is an enlarged view of a single magnetically anisotropic element forming the set of magnetically anisotropic elements in the slot wedge shown in FIG. 1.

FIG. 2 shows a single representative magnetic element 30 taken from the group disposed in the slot wedge body 12 discussed above. Although only one element will be discussed here, it is to be appreciated that each element among the group of magnetic elements 30 in the preferred embodiment is magnetically anisotropic and as such exhibits unequal magnetic properties along different orthogonal axes. By using the novel manufacturing process described in detail below, the magnetic permeability in the motor radial direction R is substantially greater than the magnetic permeability in both the motor circumferential C and motor longitudinal L directions. This results in a uniform flux distribution in the air gap between the rotor and stator. Conversely, the magnetic flux resistance in the motor circumferential C and motor longitudinal L directions is substantially greater than the resistance in the motor radial R direction. This results in a more efficient conversion of electrical energy in the stator to mechanical energy in the rotor because less flux is wasted in generating effective flux delivered to the rotor.

Figure 3:
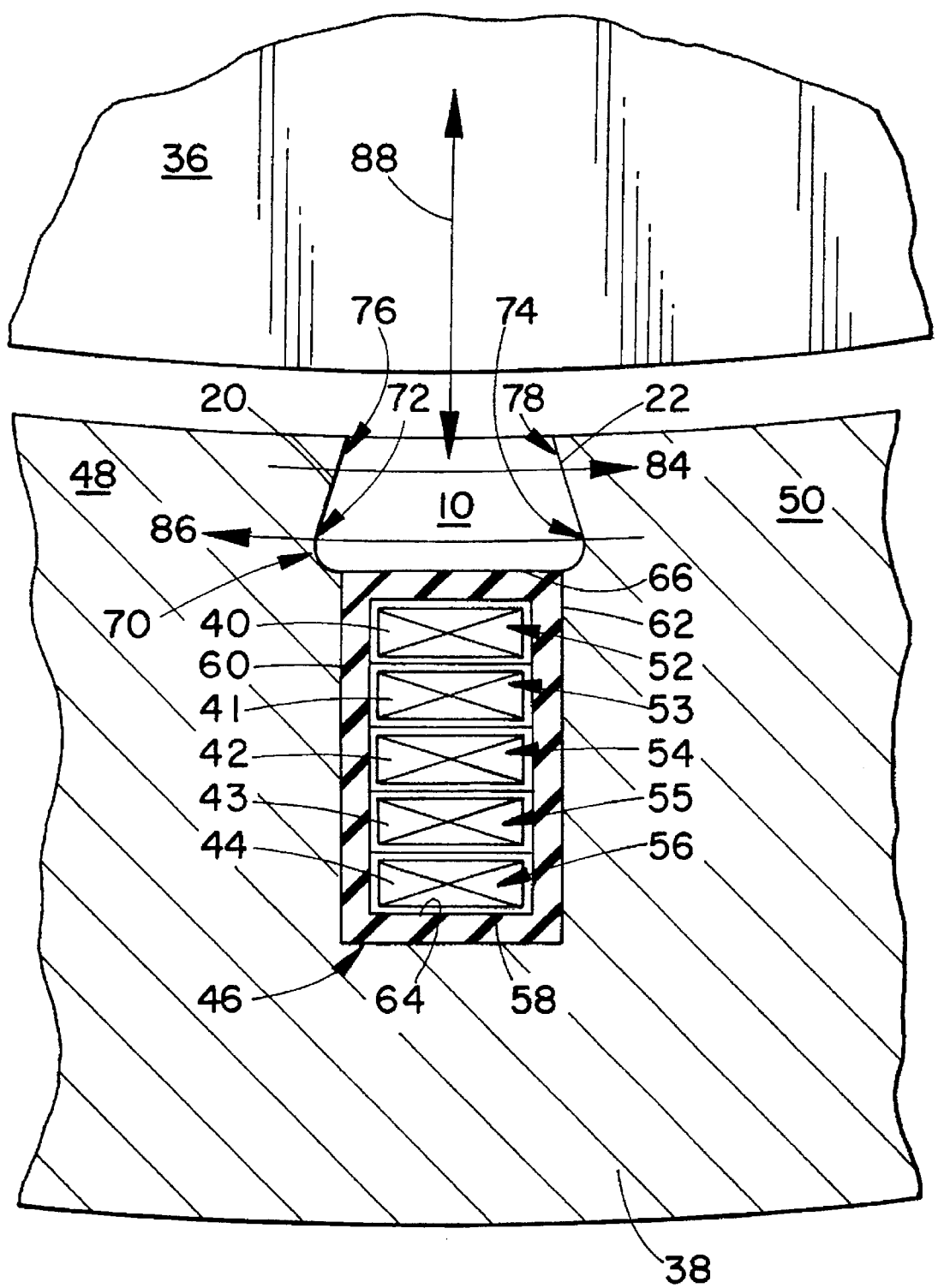
FIG. 3 is a sectional view of the principal part of a rotating electric machine showing the magnetic wedge of FIG. 1 in position.

FIG. 3 illustrates a partial sectional view of the principal part of a generic rotary electric machine including a rotor 36 and a stator 38. The electric machine is provided with a magnetic slot wedge 10 according to the present invention. As seen in the FIGURE, a set of stator windings 40–44 are disposed in a stator slot 46 between adjacent stator teeth 48, 50 according to well known winding stacking principles. Although the stator windings shown are each of solid construction it is to be understood that the magnetic slot wedge 10 of the present invention is equally well suited for use with core slots having individual magnetic wires packed between the stator core teeth.

Each stator winding 40–44 is provided with an exterior layer of insulation 52–56 respectively. The insulation prevents contact and resultant undesirable short circuiting between the windings. As such, insulation is selected to provide a sustainable dielectric function over all anticipated motor operating conditions and environments. A ground insulation layer 58 is provided to mechanically position each of the stator windings 40–44 between the left 60, right 62, and bottom 64 surfaces of the stator slot 46. The ground insulation layer 58 also provides an interface between the windings 40–44 and back side 66 of the magnetic slot wedge 10. Although the exemplary application illustrated shows a unitary ground insulation layer construction, a plurality of individual insulating material pieces may be used to provide separate insulation and physical support between the stator windings 40–44 and the left 60, right 62, and bottom 64 surfaces of the stator slot 46.

The stator slot 46 is general rectangular in cross section but preferably includes a widened region 70 adapted to receive the slot wedge 10 therein. The wedge 10 is inserted into the slot 46 merely by sliding the wedge 10 along the longitudinal dimension of the slot and into the region 70. In FIG. 3 as viewed, the longitudinal dimension of the slot is into and out of the page. In terms of motor construction, the longitudinal dimension of the slot is along a direction in parallel with the major axial length of the motor about which axis the rotor revolves. The widened region 70 defines a pair of pockets 72, 74 and a set of contact surfaces 76, 78. The pair of pockets 72, 74 define keyways along the longitudinal dimension of the slot which adapts the slot to receive the non-magnetic body 12 of the wedge 10. When the wedge is installed in the slot as illustrated, the set of contact surfaces 76, 78 engage the pair of wedge shoulder surfaces 20, 22 respectively.

According to the present invention, the magnetic resistance of the slot wedge in the width 14 and longitudinal 18 dimensions is large to discourage leakage flux 84, 86 from passing through the wedge from adjacent stator teeth 48, 50. However, the magnetic anisotropy of the group of magnetic elements 30 ensures a uniform radial magnetic flux distribution 88 in the air gap between the rotor 36 and the stator 38.

Figure 4:
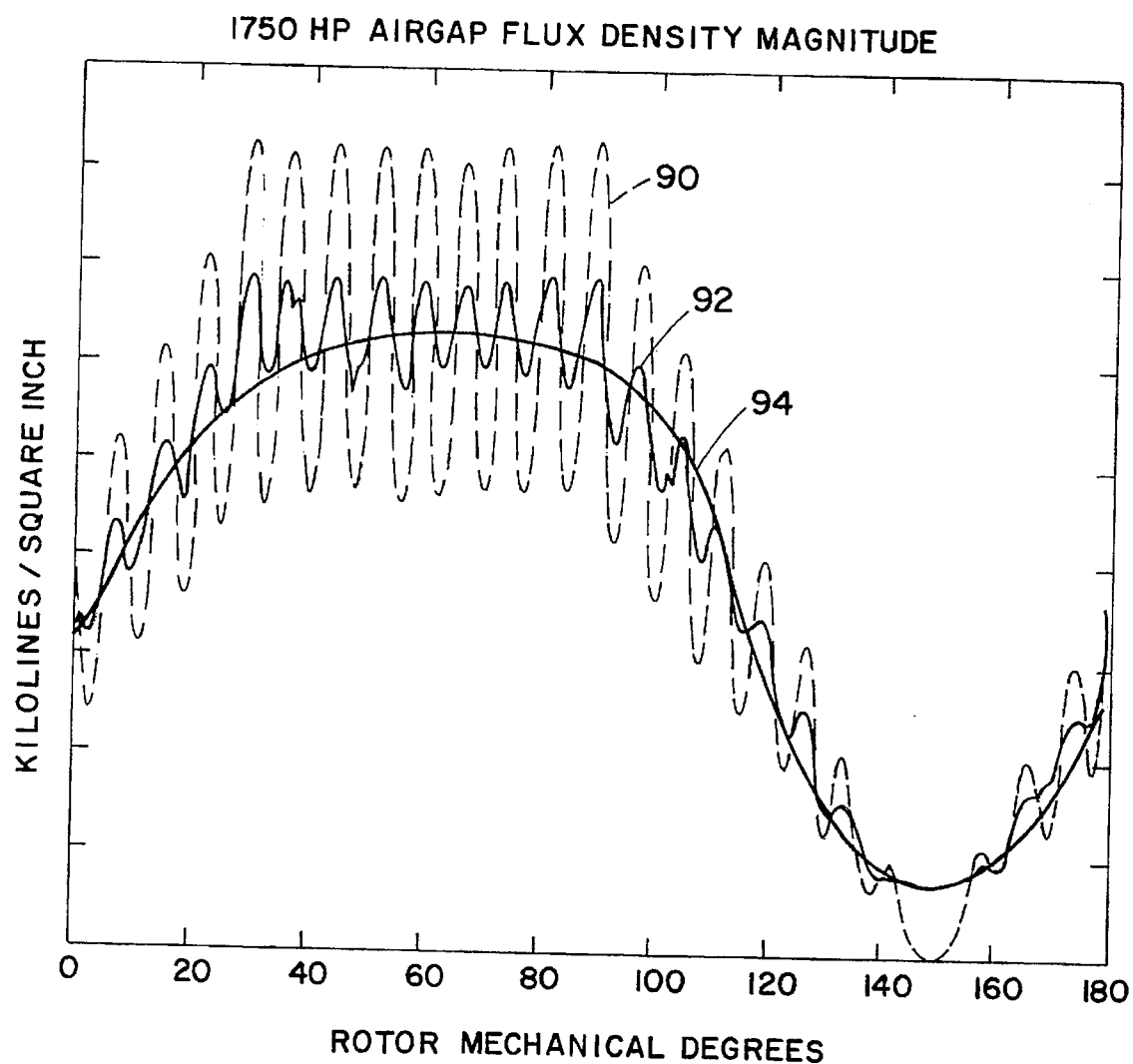
FIG. 4 is a graph showing a relation between the position of the core slot in rotor mechanical degrees and the air gap magnetic flux density; and, FIGS. 5A–5E are illustrations of the preferred method of fabricating the magnetic slot wedge according to the present invention.

FIG. 4 illustrates the relative difference between the air gap flux density 90 found in a motor using prior art non-magnetic type slot wedges versus the air gap flux density 92 realized in the same motor using the slot wedges of the present invention. In that FIGURE, the relative magnitudes of the air gap flux densities in kilolines per square inch are plotted versus rotor mechanical degrees of rotation. As can be seen from the curves, the peak to peak amplitude of the air gap flux 90 using prior art non-magnetic wedges is substantially greater than the peak to peak amplitude of the air gap flux 92 using the wedges of the present invention. Although both air gap flux curves average to an equivalent sinusoidal flux curve 94, the "peaky" flux distribution resultant from the slot wedge constructions of the prior art places more of a demand for electric current in the stator windings than does the more smoothly distributed flux in the motor with the present invention. Major prior art design concerns include stator metal saturation and stator winding driving current levels required to accommodate the severe peak to peak flux. However, in the instant invention, less stator winding current is called for to generate the air gap flux 92 while yet realizing an equivalent average sinusoidal air gap flux 94.

Figure 5A:
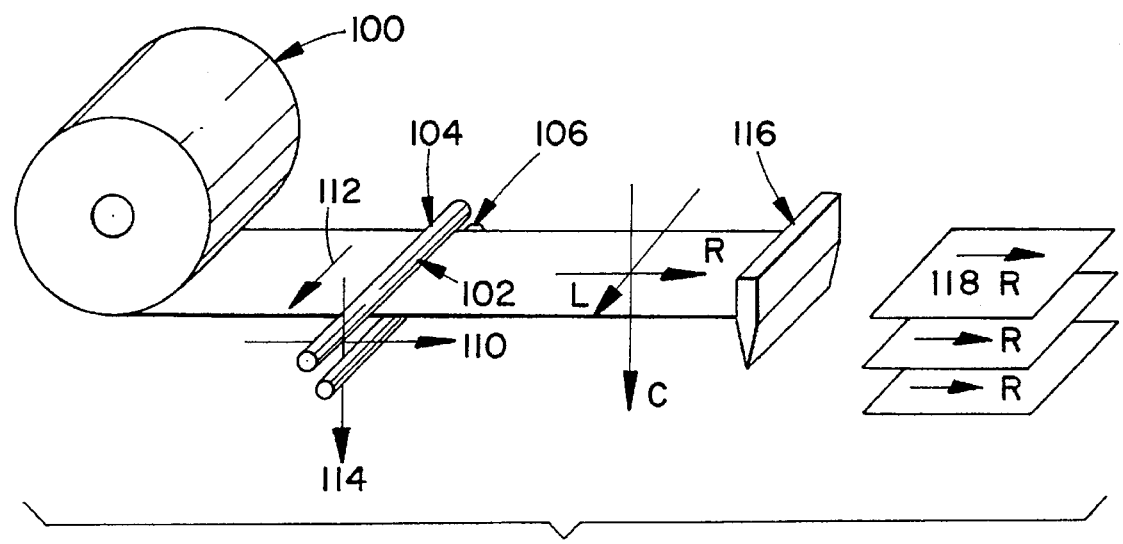

Referring now to FIGS. 5A–5E, a preferred process for manufacturing the anisotropic slot wedge 10 is illustrated. In FIG. 5A, a roll of low carbon sheet steel 100 is unwound and cold worked as the steel is passed through a nip 102 formed between a pair of press rollers 104, 106. The cold rolling process shown in the FIGURE is followed with an annealing step such as a magnetic quality development annealing process commonly referred to in the art as "QDA". The cold rolling and annealing steps develop a magnetic anisotropic property or characteristic in the sheet steel whereby a direction of high permeability R is established in the rolling direction 110. Orthogonal directions of low permeability C,L are established in the transverse rolling direction 112 and in the nip compression direction 114 respectively. A blade 116 is used to cut the cold rolled sheet steel into individual magnetically anisotropic steel sheets 118. Although only a single set of press rollers 104, 106 are shown in the FIGURE, a sequence of cold rolling steps may be performed along with various annealing and trimming processes in order to generate steel sheets 118 exhibiting the desired magnetic anisotropic property.

Figure 5B:
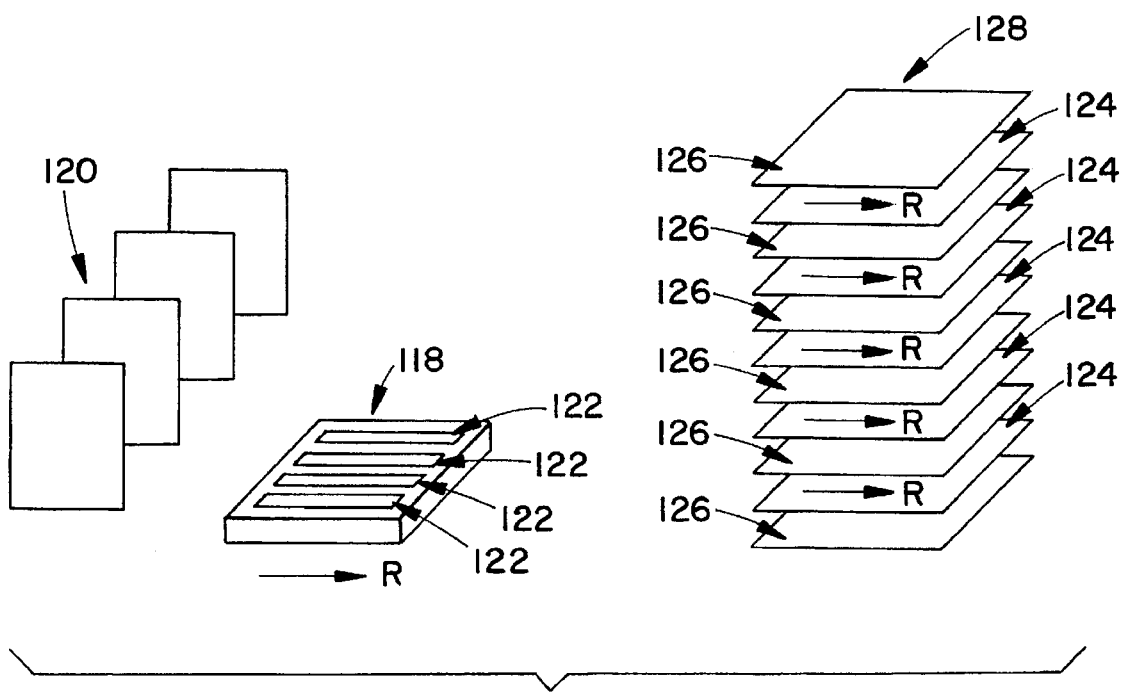

In FIG. 5B each of the individual steel sheets 118 are passed through a punch press whereby a set of mechanical punches 120 are operated through each steel sheet to create a corresponding set of apertures 122 in each resultant steel sheet lamination 124. Although the preferred punch configuration produces cutouts in the steel sheet laminations which are substantially rectangular, other shapes such as triangular, oval, or semi-circular aperture configurations are possible. For certain aperture configurations where the shearing stresses significantly perturb the magnetic properties of the sheets, a further quality development annealing step may be necessary to re-establish anisotropy. Alternatively, other techniques may be used to produce the desired aperture geometries without damage to the sheet magnetic properties such as laser cutting, chemical photo-etching, fine blanking or cryogenic punching as examples.

A set of metal sheet laminations 124, preferably five (5) as illustrated, are assembled into a loose collection 128 of alternating anisotropic steel laminations 124 and B stage glass epoxy 126 sheets of similar size. Preferably, the magnetic orientation of each of the steel sheet laminations 124 is uniform throughout the collection of steel and epoxy sheets 128. Although a B stage glass epoxy is preferred, other epoxies having suitable properties may be used as well.

Figure 5C:
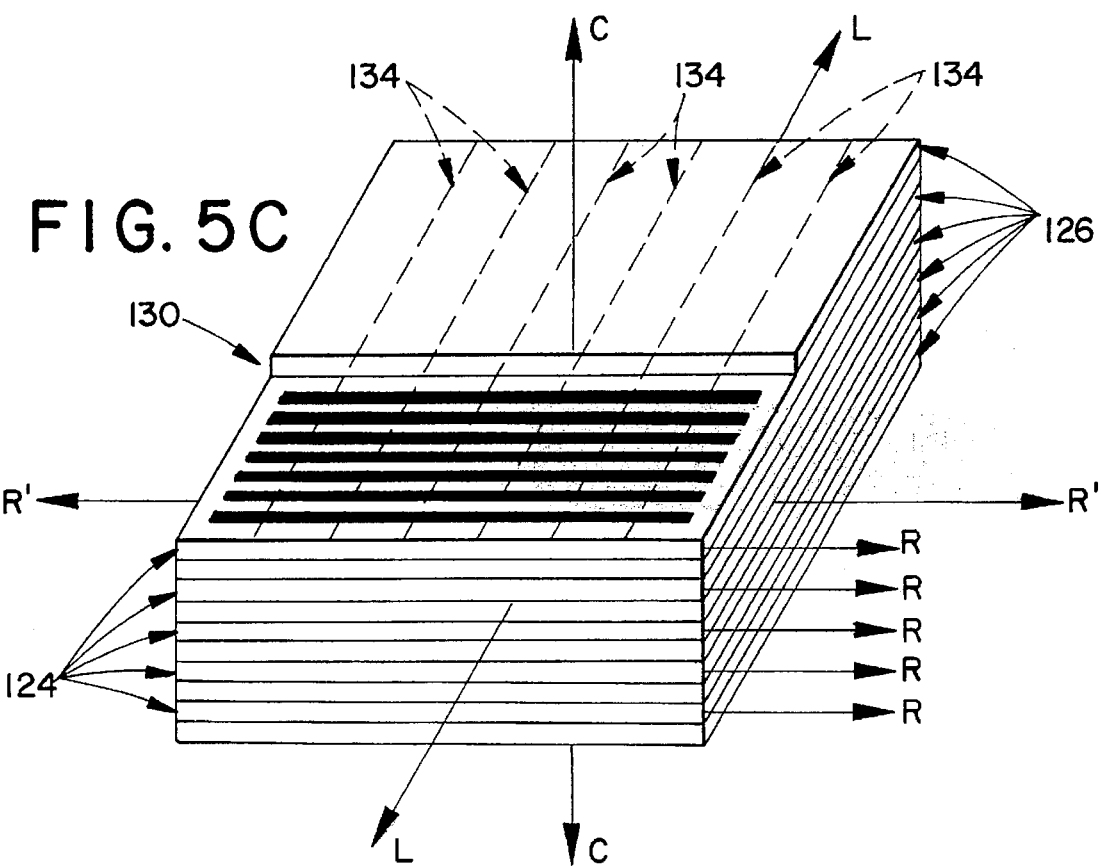

The collection of steel and epoxy sheets 128 are assembled into a regular laminated stack 130 as shown in FIG. 5C. The stack 130 is hot pressed for a period of time and at a temperature and pressure sufficient to promote the softening and then flow of the B stage glass epoxy sheets 126 into the apertures 122 of the steel sheet laminations 124. The temperature and pressure, however, is established and maintained at a level below that which would cause contact between adjacent steel sheet laminations 124. After adequate B stage material flow is established, the hot pressed stack 130 is permitted to cure for a period of time sufficient to permit further handling and machining operations. Preferably, during the hot press and cure processes, an even spacing between each of the steel laminations 124 is maintained.

The result of the hot press and cure process is a unitary construction as shown. Preferably, the hot press and cure processes are performed in a vacuum or by other means well known in the art to produce a structure which is free of air pockets in the apertures 122 or elsewhere. More significantly, however, the unitary structure defines an overall direction of high magnetic permeability R' and orthogonal directions C,L of low magnetic permeability due to the sum magnetic anisotropic contribution R of each individual steel sheet lamination 124 forming the structure 130.

Figure 5D:
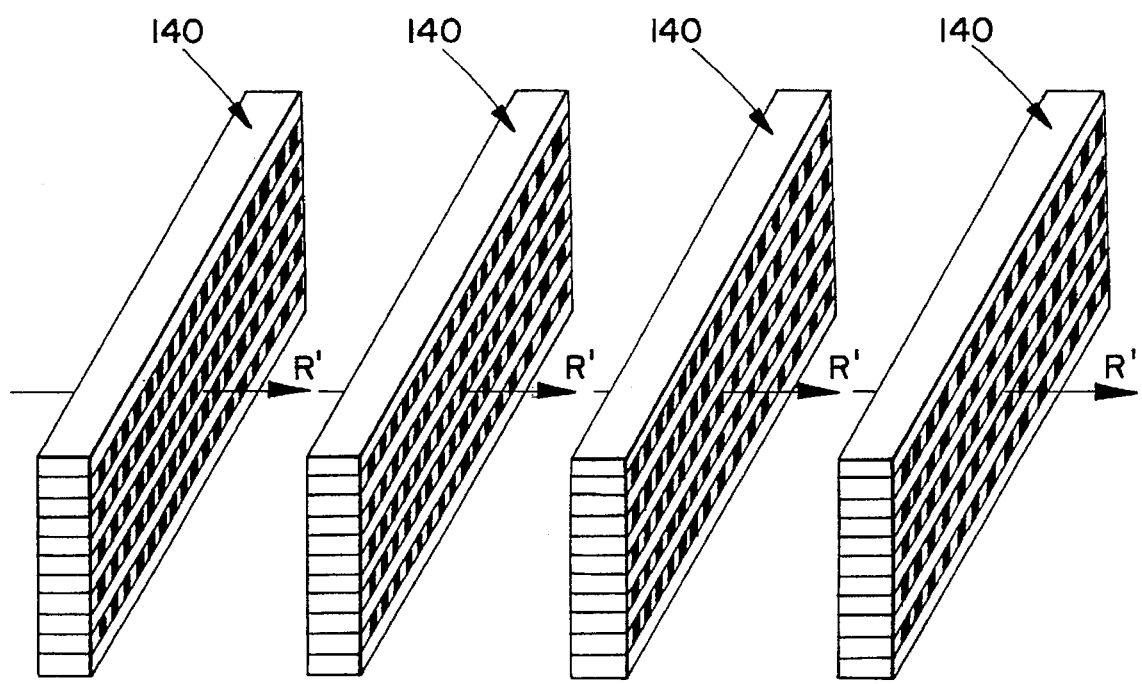

A plurality of laminated flux bars 140 are produced by slicing the hot pressed and cured construction 130 along a set of parallel lines 134. FIG. 5D shows four (4) flux bars 140 made from the unitary construction discussed above. Each of the plurality of flux bars 140 is individually magnetically anisotropic.

Figure 5E:
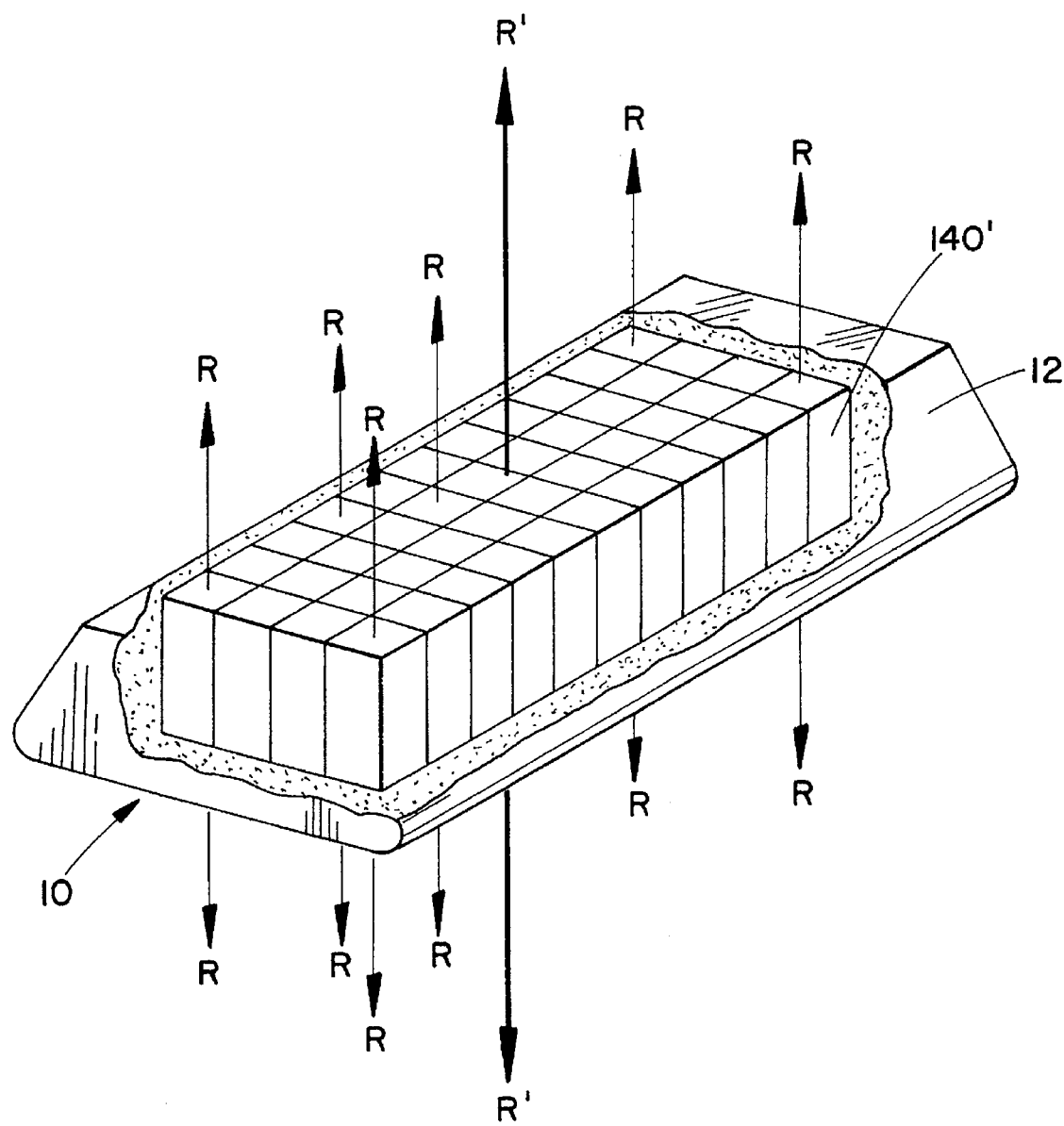

As illustrated in FIG. 5E, a single flux bar 140' is used within the non-magnetic body 12 of a slot wedge 10. The flux bar 140' is preferably machined to produce the desired outer wedge shape and the dipped into a curable non-magnetic material which provides an insulating and protective outer coating. Other methods of forming the wedge shape surrounding the flux bar 140' are possible as understood by those of ordinary skill in the art including extrusion techniques or the like which are equally well suited for producing the slot wedge shape of the preferred embodiment.

The invention has been described with reference to the preferred embodiment. Obviously, modifications and alterations will occur to others upon a reading and understanding of this specification. It is our intention to include all such modifications and alterations insofar as they come within the scope of the appended claims and equivalents thereof.

We claim:

1. A magnetic wedge for use in an electromagnetic device of the type having an elongate core slot, the magnetic wedge comprising:

a body member defining a longitudinal dimension which extends along said core slot, a thickness dimension in a plane perpendicular to the longitudinal dimension and in a direction of the depth of the core slot, and a width dimension in a plane perpendicular to the longitudinal dimension and in a direction of the width of the core slot; and, at least one magnetic member disposed in said body member, the at least one magnetic member having an overall first magnetic permeability in said thickness dimension and an overall second magnetic permeability in said width dimension, the second magnetic permeability being less than said first magnetic permeability.

2. The magnetic wedge according to claim 1 wherein said at least one magnetic member includes an overall third magnetic permeability in said longitudinal dimension, the third magnetic permeability being less than said first magnetic permeability.

3. The magnetic wedge according to claim 2 wherein:

said overall first magnetic permeability in said thickness dimension is an average magnetic permeability of the at least one magnetic member in said thickness dimension;

said overall second magnetic permeability in said width dimension is an average magnetic permeability of the at least one magnetic member in said width dimension; and, said overall third magnetic permeability in said longitudinal dimension is an average magnetic permeability of the at least one magnetic member in said longitudinal dimension.

4. The magnetic wedge according to claim 2 further comprising a plurality of magnetic members disposed in said body member, each of the plurality of magnetic members having said overall first magnetic permeability in said thickness dimension and having said second magnetic permeability in said width and longitudinal dimensions.

5. The magnetic wedge according to claim 4 wherein said body member is substantially non-magnetic.

6. The magnetic wedge according to claim 5 wherein the second magnetic permeability and the third magnetic permeability of said plurality of magnetic members are substantially equivalent.

7. The magnetic wedge according to claim 1 further comprising a plurality of magnetic members disposed in said body member, each of the plurality of magnetic members having said overall first magnetic permeability in said thickness dimension and having said second magnetic permeability in said width dimension.

8. The magnetic wedge according to claim 7 wherein each of said plurality of magnetic members include an overall third magnetic permeability in said longitudinal dimension, the third magnetic permeability being less than said first magnetic permeability.

9. A magnetic wedge for use in an electromagnetic device of the type having an elongate core slot, the magnetic wedge comprising:

a body member defining a longitudinal dimension which extends along said core slot, a thickness dimension in a plane perpendicular to the longitudinal dimension and in a direction of the depth of the core slot, and a width dimension in a plane perpendicular to the longitudinal dimension and in a direction of the width of the core slot; and, at least one magnetic member disposed in said body member, the at least one magnetic member having an overall first magnetic permeability in said thickness dimension and an overall second magnetic permeability in said longitudinal dimension, the second magnetic permeability being less than said first magnetic permeability.

10. The magnetic wedge according to claim 9 further comprising a plurality of magnetic members disposed in said body member, each of the plurality of magnetic members having said overall first magnetic permeability in said thickness dimension and having said second magnetic permeability in said longitudinal dimension.

11. The magnetic wedge according to claim 10 wherein said plurality of magnetic members are substantially evenly spaced apart in said body member.

12. The magnetic wedge according to claim 11 wherein said plurality of magnetic members extend substantially completely through said body member in said thickness dimension.

13. The magnetic wedge according to claim 12 wherein:

said overall first magnetic permeability in said thickness dimension is an average magnetic permeability of the plurality of magnetic members in said thickness dimension; and, said overall second magnetic permeability in said longitudinal dimension is an average magnetic permeability of the plurality of magnetic members in said longitudinal dimension.

14. In combination with a slot wedge of the type having a substantially non-magnetic body member defining a thickness dimension which extends radially into a core slot of a rotating electric machine, and defining a width dimension perpendicular to said thickness dimension and a longitudinal dimension perpendicular to said thickness dimension, a magnetic element comprising:

a plurality of magnetic members disposed in said slot wedge, each of said plurality of magnetic members having a first magnetic permeability in said thickness dimension, a second magnetic permeability in said width dimension, and a third magnetic permeability in said longitudinal dimension, the second magnetic permeability and the third magnetic permeability being less than said first magnetic permeability.

15. The combination according to claim 14 wherein each of said plurality of magnetic members are formed of a magnetic material, the magnetic material having said first magnetic permeability maximized in said thickness direction.

16. A method of constructing a magnetic wedge of the type used in an electromagnetic device having an elongate core slot, the method comprising the steps of:

providing at least one magnetic member having an overall first magnetic permeability in a first direction, an overall second magnetic permeability in a second direction, and an overall third magnetic permeability in a third direction, said second and third magnetic permeabilities being less than said first magnetic permeability and said first second and third directions being substantially orthogonal to each other; and, disposing said at least one magnetic member in a non-magnetic body member defining a longitudinal dimension which extends along the core slot of the electromagnetic device, a thickness dimension in a plane perpendicular to the longitudinal dimension and in a direction of the depth of the core slot, and a width dimension in a plane perpendicular to the longitudinal dimension and in a direction of the width of the core slot.

17. The method of constructing a magnetic wedge according to claim 16 wherein the step of disposing said at least one magnetic member in said non-magnetic body member includes:

positioning said at least one magnetic member in said non-magnetic body member in a manner that said first magnetic permeability in said first direction is along said thickness dimension of the non-magnetic body member;

said second magnetic permeability in said second direction is along said longitudinal dimension of the non-magnetic body member; and, said third magnetic permeability in said third direction is along said width dimension of the non-magnetic body member.

18. The method of constructing a magnetic wedge according to claim 17 wherein the step of providing said at least one magnetic member includes laminating a plurality of magnetically anisotropic sheets of material with a non-magnetic material to form a laminated structure.

19. The method of constructing a magnetic wedge according to claim 18 wherein:

the step of providing said at least one magnetic member includes cold rolling and annealing a plurality of sheets of material to form said plurality of magnetically anisotropic sheets of material; and, the step of laminating said plurality of magnetically anisotropic sheets of material with said non-magnetic material to form said laminated structure includes heat processing and curing said laminated structure.

* * * * *